United States Patent Office 3,780,033
Patented Dec. 18, 1973

3,780,033
PROCESS FOR PREPARING CEPHALOSPORIN
COMPOUNDS
George G. Hazen, Westfield, N.J., assignor to Merck &
Co., Inc., Rahway, N.J.
No Drawing. Filed Nov. 29, 1971, Ser. No. 203,051
Int. Cl. C07d 99/16, 99/24
U.S. Cl. 260—243 C                    6 Claims

ABSTRACT OF THE DISCLOSURE

A process for preparing 7-acylamino - 7 - methoxy cephalosporin is provided which comprises methoxylating a substituted 7 - [1 - loweralkoxyethylideneamino]-cephalosporin, then hydrolyzing to remove the imino linkage. The final products have antibacterial activity.

---

This invention relates to a process for preparing a compound having the formula:

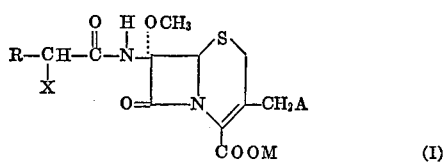

(I)

wherein X is hydrogen, amino, or carboxyl; R is phenyl or a 5-membered heterocyclic ring having 1-2 hetero atoms, the latter being either S, O, or N; A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkyl, thiocarbamoyloxy, pyridinium, alkylpyridinium, halopyridinium, or aminopyridinium; and M is potassium, benzyl, benzhydryl, trimethylsilyl, sodium trichloroethyl, methoxymethyl, hydrogen, benzoylmethyl, or methoxybenzyl.

In summary, this invention provides two new routes for methoxylating a compound of the formula:

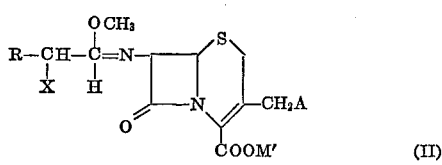

(II)

wherein R, X, and A are as defined above, and M' is an easily removed ester group such as benzyl, benzhydryl, trimethylsilyl, trichloroethyl, methoxymethyl, benzoylmethyl, or methoxybenzyl. Also operable as starting materials are compounds having a loweralkoxy group of from 2–4 carbon atoms, instead of the methoxy substituent, on the ethylidene chain.

The first route utilizes a methoxylating agent in conjunction with an activated form of the Compound II. The "activated form" of Compound II is prepared in situ by treating Compound II with a strong base. The "activated form" is a metal salt of Compound II. The strong base is preferably an inorganic base, such as sodium hydride, sodium hydroxide, potassium hydroxide, phenyl lithium, t-butyl lithium, or the like. Most preferably, sodium hydride, phenyl lithium, or t-butyl lithium are used. The activated salt is not isolated, but the methoxylating agent added directly to the reaction mixture. It is noted that the activated salt is stable, and can be isolated if kept at low temperature under an inert atmosphere. However, its isolation is not necessary to practice this invention.

The reagents which can be employed in this first route can be selected from dimethyl peroxide, methyl t-butyl-peroxide, methylphenyl sulfenate, o-methyldimethyl sulfoxonium methosulfate, or N-methoxypyridinium methosulfate.

The reagents are mixed in an inert solvent at temperatures ranging from −90° C. to −50° C. and preferably at about −78° C. An inert atmosphere is used for safety purposes. Each reactant is employed in approximately equimolar amounts. After methoxylation is complete, in 1–5 hours, the reaction mixture is diluted by addition of aqueous acid, such as acetic or hydrochloric acids. The acid acts to hdyrolyze the iminoether linkage to the desired amido side chain. The entire reaction proceeds spontaneously and is completed within 2–10 hours. The exact end point can be monitored using chromatographic techniques, and the duration of the reaction will obviously depend upon the concentration and temperature.

The second route again involves first, the treatment of Compound II with a strong base to prepare an activated metal salt. The strong base is preferably an inorganic base, such as sodium hydride, sodium hydroxide, potassium hydroxide, phenyl lithium, t-butyl lithium, or the like. Most preferably, phenyl lithium, t-butyl lithium, or sodium hydride are used. The activated salt intermediate is not isolated, but treated immediately with a brominating reagent, such as bromine, N-bromo succinimide, N-bromo acetamide, t-butylhypobromite or perhalomethylhypobromite, and the like. Subsequently, the reaction mixture is treated with methanol in the form of a mixture of methanol and a catalytic suspension of a metal oxide, such as silver oxide.

Each of the three reactants, (the starting material II, the brominating reagent, and the methanol) is employed in approximately equimolar amounts. The bromination reaction is conducted at low temperatures, preferably between −30° C. to 10° C., and most preferably at about −20° C. to 0° C. The methanolic addition can be conducted at ambient temperatures. After the methoxylation is complete, the reaction mixture is acidified with aqueous acid, such as acetic or hydrochloric acids. The acid acts to hydrolyze the imino ether linkage to the desired amido side chain.

Each step of the reaction is completed within 30 minutes to 3 hours, and the exact end point can be easily determined using chromatographic monitoring techniques.

The starting material, an ester of 7β-1-loweralkoxy (2-substituted ethylideneamino) - 3-substituted-methyl-decephalosporanic acid, can be prepared using a number of methods; one suitable route starts from a 7-aminocephalosporin in reaction with a suitable substituted acetyl halide. The exact preparative route is given below in the specification.

The final products, the esters of free acid of 7β-substituted-acetamido - 7α - methoxy-3-substituted methyldecephalosporanic acid are useful as an antibacterial agent against both gram-positive and gram-negative bacteria. In addition, resistance to β-lactamases has been demonstrated. The activity spectrum includes effectiveness against many bacteria, including in vivo on Proteus morganii, and in addition, against E. coli, P. vulgaris, P. mirabilis, S. schottmuelleri, K. pneumoniac AD, K. pneumoniae B, and P. arizoniae.

In addition to the specific end product as defined in structural Formula I, other compounds which are active antibacterials can also be prepared using the process described herein. The compounds which can be prepared have the following structural formula:

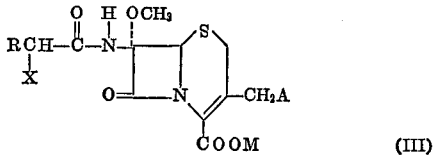

(III)

In addition, the analogous Δ² compounds which can also be prepared using the processes described herein are valuable intermediate compounds because of their greater acid stability, and can be converted to the Δ³ compounds easily. The various substituents have the following meanings: X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted heterocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl.

A is hydrogen, hydroxy, halo, mercapto, cyano, alkanoyloxy, alkanoylthio, aroyloxy, aroylthio, heteroaryloxy or heteroarylthio, the hetero ring having 5–6 members and having 1–3 hetero atoms, being O, S, or N or combinations thereof, azido, amino, carbamoyloxy, alkoxy, alkylthio, carbamoylthio, thiocarbamoyloxy, benzoyloxy, (p-chlorobenzoyl)oxy, (p-methylbenzoyl)oxy, pivaloyloxy, (1-adamantyl)carboxy, substituted amino such as alkylamino, dialkylamino, alkanoylamino, carbamoylamino, N-(2-chloroethylamino), 5-cyano-triazol-1-yl, 4-methoxy-carbonyltriazol-1-yl, or quaternary ammonium such as pyridinium, 3-methylpyridinium, 4-methylpyridinium, 3-chloropyridinium, 3-bromopyridinium, 3-iodopyridinium, 4-carbamoylpyridinium, 4-(N-hydroxymethylcarbamoyl)-pyridinium, 4-(N-carbomethoxycarbamoyl)pyridinium, 4-(N-cyanocarbamoyl)pyridinium, 4-(carboxymethyl)pyridinium, 4-(hydroxymethyl)pyridinium, 4-(trifluoromethyl)pyridinium, quinolinium, picolinium, or lutidinium; N-loweralkylcaramoyloxy, N, N-dilower alkylthiocarbamoyloxy, alkanoylcarbamoyloxy, hydroxyphenyl, sulfamoyloxy, alkylsulfonyloxy, or (cis-1,2-epoxypropyl)phosphono; a nd M is an alkali metal, benzyl, alkanoyloxymethyl, alkylsilyl, phenalkanoyl, benzhydryl, alkoxyalkyl, alkenyl, trichloroethyl, hydrogen, benzoylmethyl, or methoxybenzyl.

Preferably, X is hydrogen, amino or carboxyl; R is phenyl, or a 5–6 membered heterocyclic ring having 1–2 heteroatoms, the latter being either S, O, or N;

A is hydrogen, halo, azido, cyano, hydroxy, alkoxy, carbamoyloxy, thiocarbamoyloxy, N-loweralkylcarbamoyloxy, N,N-diloweralkylcarbamoyloxy, N-loweralkylthiocarbamoyloxy, N,N - diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis-1,2-epoxypropyl)phosphono; and M is alkali metal, benzyl, alkylsilyl, phenalkanoyl, alkoxyalkyl, pivaloyloxymethyl, alkenyl, trichoroethyl, hydrogen, benzoymethyl, or methoxybenzyl.

Even more preferably, X is hydrogen, amino, or carboxyl; R is phenyl or a 5-membered heterocyclic ring having 1–2 hetero atoms, the latter being either S, O, or N;

A is hydrogen, loweralkanoyloxy, heteroraylthio, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

Still more preferably, X is hydrogen or carboxyl;

R is phenyl, or a 5-membered heterocyclic ring having one O or one S hetero atom;

A is hydrogen, loweralkanoyloxy, carbamoyloxy, N-loweralkylcarbamoyloxy, N,N-diloweralkylcarbamoyloxy, pyridinium, alkylpyridinium, halopyridinium, or aminopyridinium; and M is sodium, potassium, benzhydryl, methoxymethyl, or hydrogen.

Most preferably, X is hydrogen, or carboxyl;

R is phenyl, thienyl, or furyl;

A is hydrogen, loweralkanoyloxy, carbamoyloxy, or pyridinium; and

M is sodium, potassium, benzhydryl, methoxymethyl, or hydrogen.

In addition, compounds of Formula III above wherein the sulfur atom is present as the sulfoxide $$\overset{|}{\underset{|}{S}} \rightarrow O$$

can be prepared in this inventive reaction.

It will also be apparent to one skilled in the art that the inventive reaction of this application can be used to prepare analogous compounds in the penicillin series, viz.:

$$R-\underset{\underset{X}{|}}{CH}-\overset{O}{\overset{\|}{C}}-\overset{H}{\underset{|}{N}}\overset{OCH_3}{\underset{}{\diagdown}}\underset{O=\underset{}{\overset{}{\diagup}}N}{\overset{S}{\diagup}}-COOM \qquad (IV)$$

wherein R, X, and M are the same as defined in Formula III.

The compounds of Formula III can generally be prepared from 7–ACA or known derivatives thereof using the general process outlined in the preparative examples. Using processes described herein, the 7-iminomethylether intermediate is first prepared then the desired 7α-methoxy group substituted pursuant to the inventive processes.

The blocking group on the acid functionality at position-4 of the cephalosporin ring can be removed following any of the reactions of this invention. The removal can be accomplished using methods available to those in the art.

The penicillins of Formula IV can be prepared from 6–APA or known derivatives thereof using procedures analogous to those described for the cephalosporins.

Other starting materials useful in the application of these inventive reactions to prepare the end compounds described herein can be prepared in accordance with known methods, see, e.g., Belgium Pat. 650,444 or U.S. Pat. 3,117,126, or using the following preparations.

The term "loweralkyl" means a carbon chain having 1–6 carbon atoms; when more than one group appears, they can be the same or different. The term "alkyl" means 1–10 carbon atoms; "loweralkanoyl" means 1–6 carbon atoms.

PREPARATION 1

3-hydroxymethyl-7-aminodecephalosporanic acid

The 3 - hydroxymethyl-7-aminodecephalosporanic acid is obtained as the lactone by acid hydrolysis of cephalosporin C in accordance with procedures known in this art.

PREPARATION 2

3-pyridiniummethyl-7-aminodecephalosporanic acid

This compound is prepared by treating cephalosporin C with pyridine followed by acid hydrolysis as described in U.S. Pat. 3,117,126.

PREPARATION 3

3-methyl-7-aminodecephalosporanic acid

This compound is prepared from cephalosporin C by catalytic reduction followed by hydrolytic removal of the 5-aminoadipoyl side chain as described in U.S. Pat. 3,129,224.

PREPARATION 4

3-chloromethyl-7-aminodecephalosporanic acid

This compound is prepared from the 3-methyl compound by reaction with chlorine gas. The bromomethyl or iodomethyl derivatives can be prepared from the 3-hydroxymethyl compound by reaction with phosphorus tribromide or phosphorus triiodide, respectively.

The starting materials used in the preparation of the compounds of Formula 1 can be prepared as follows:

PREPARATION 5

3-carbamoyloxymethyl-7-aminodecephalosporanic acid

7 - aminocephalosporanic acid is treated with 5-butoxycarbonylazide to produce the 7β - (t-butoxycarbonyl) derivative in accordance with known methods. This derivative is then intimately contacted with citrus acetylesterase in aqueous phosphate buffer at pH 6.5–7 for 15 hours and 3 - hydroxymethyl 7β - (t-butoxycarbonyl) aminodecephalosporanic acid is recovered from the resulting reaction mixture.

To 0.2 g. of 3 - hydroxymethyl 7β- (t-butoxycarbonyl) aminodecephalosporanic acid suspended in 5 ml. of acetonitrile, cooled to 0° C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3-carbamoyloxymethyl-7β-(t-butoxycarbonyl)aminodecephalosporanic acid which is recovered as a yellow solid.

3 - carbamoyloxymethyl - 7β - (t-butoxycarbonyl) aminodecephalosporanic acid (0.5 g.) in 3.5 ml. of anisole is stirred with 2 ml. of trifluoroacetic acid at 0° C. for 5 minutes. The resulting reaction mixture is evaporated under reduced pressure to afford 3-carbamoyloxymethyl-7-aminodecephalosporanic acid which is purified further by crystallization from ethylacetate.

PREPARATION 6

Trimethylsilyl 3-carbamoyloxymethyl-7-aminodecephalosporanate

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl 3-carbamoyloxymethyl-7-aminodecephalosporanate.

PREPARATION 7

Benzhydryl 7-[1-methoxy-2-(2-thienyl)ethylideneamino]-3-carbamoyloxymethyldecephalosporanate (A) 7-amino-3-carbamoyloxymethyldecephalosporanic acid benzhydryl ester: 272 mg. of 7-amino-3-carbamoyloxymethyldecephalosporanic acid is slurried 5 min. at 25° C. in 7 ml. dioxane with 170 mg. p-toluenesulfonic acid·H₂O. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient K₂HPO₄ to bring the pH to 8. The layers are separated and the aqueous portion extracted twice more with CH₂Cl₂. The combined organic layers are dried with sodium sulfate, filtered and evaporated, leaving oily crystals. Washing with ether affords a dry solid which is the product, 7-amino-3-carbamoyloxymethyldecephthalosporanic acid benzhydryl ester.

In a like manner, the benzhydryl and other esters of 3-methyl-7-aminodecephalosporanic acid, 3-chloromethyl-7-aminodecephalosporanic acid, and 7-aminocephalosporanic acid can be prepared.

(B) Benzhydryl 3-carbamoyloxymethyl-7-(2-thienylacetamido)decephalosporanate: Benzhydryl 7-amido-3-carbamoyloxymethyldecephalosporanate (452 mg.) is reacted with 161 mg. thienylacetyl chloride in 25 ml. methylene chloride containing 0.5 ml. pyridine.

The reaction mixture is held at 0° C. for 15–60 minutes and then raised to room temperature and held an additional 15–60 minutes. The mixture is then washed with water, dilute phsphoric acid (buffered to pH 2), water, and dilute sodium bicarbonate. After drying with MgSO₄, the solution is filtered and evaporated. The crude solid is purified by chromaatography on silica gel, and eluted using, for instance, 4:1 chloroform-ethyl acetate. The product prepared is the benzhydryl 7-(2-thienylacetamido)-3-carbamoyloxymethyldecephalosporanate.

(C) Benzhydryl 3-carbamoyloxymethyl-7-[1-methoxy-2-(2-thienyl)ethylideneamino]decephalosporanate: Benzhydryl 7-(2-thienylacetamido)-3-carbamoyloxymethyldecephalosporanate (2.5 g.) in 260 ml. of methylene chloride and 10 ml. of pyridine is added over 10 minutes to a clear solution of 6.25 g. of PCl₅ in 100 ml. of methylene chloride. The temperature is maintained at −20° C. After 45 minutes, 64 ml. of methanol is added and the temperature allowed to rise to 15° C. The solvents are removed at low temperature in vacuo. The crude material is then purified by chromatography. The eluant is then removed at −20° C. in vacuo. The iminoether intermediate is used directly in the examples. However, IR and NMR spectra indicate that the structure corresponding to the compound benzhydryl 3-carbamoyloxymethyl-7-[1-methoxy-2-(2-thienyl)ethylideneamino] - decephalosporanate is present.

This invention is further illustrated by the following examples.

EXAMPLE 1

7-(2-thienylacetamido)-7-methoxy-3-carbamoyloxymethyldecephalosporanic acid benzhydryl ester Benzhydryl 7-[1-methoxy - 2 - (2-thienyl)ethylideneamino]-3-carbamoyloxymethyldecephalosporanate as prepared above, 527 mg., is dissolved in 20 ml. dry tetrahydrofuran. At −78° C. under nitrogen, 0.435 ml. of 2.3 M phenyl lithium is added. Bis(methyl)peroxide, 62 mg., is then added and then the reaction mixture is allowed to warm to room temperature over a one-hour period. Ethylacetate, 150 ml., containing 0.1 ml. acetic acid is added and the mixture washed with dilute hydrochloric acid, dried over MgSO₄, filtered and evaporated, providing the crude product. The reaction mixture separated into fractions by chromatography on silica gel, eluting with 25:1 chloroform-ethylacetate. The desired product, 7-(2-thienylacetamido)-7-methoxy-3-carbamoyloxymethyldecephalosporanic acid benzhydryl ester, is identified.

In a like manner, 104 mg. of methyl t-butyl peroxide, 140 mg. of methyl phenyl sulfenate, or 221 mg. of N-methoxy pyridinium methosulfate can be used in place of the dimethyl peroxide to prepare the 7-methoxy compounds.

EXAMPLE 2

7-(2-thienylacetamido)-7-methoxy-3-carbamoyloxymethyldecephalosporanic acid benzhydryl ester Benzhydryl 7-[1-methoxy - 2 - (2-thienyl)ethylideneamino] - 3 - carbamoyloxymethyldecephalosporanate, 510 mg., is dissolved in 15 ml. of anhydrous THF under nitrogen and cooled to −78° C. 0.5 ml. of a 2.3 M solution of phenyl lithium is added dropwise. The reaction mixture is stirred at —78° C. for 5 minutes. 0.2 grams of N-bromosuccinimide in 3 ml. of anhydrous THF is then added. The cooling bath is removed and the reaction mixture is allowed to come to 0° C. The solvent is removed under reduced pressure and the residue is taken up in methylene chloride 30 ml. and washed once with pH 7 phosphate buffer and then with water, dried and evaporated to a volume of about 10 ml.

The concentrated solution contains benzhydryl 7-[1-methoxy-2-(2-thienyl)ethylideneamino] - 7 - bromo-3-carbamoyloxymethyldecephalosporanate, and is used directly in the next step.

Silver oxide (200 mg.) is suspended in 20 ml. of methanol. The concentrated solution obtained above is added dropwise over 10 minutes to the silver oxide suspension. The reaction mixture is stirred for another 15 minutes. The silver salts are filtered off and the filtrate is evaporated and the residue taken up in 150 ml. ethylacetate containing 0.1 ml. acetic acid. The mixture is washed three times with dilute hydrochloric acid, then with pH 7 phosphate buffer, then dried and evaporated to give benzhydryl 7-(2-thienylacetamido)-7-methoxy-3-carbamoyloxymethyldecephalosporanate.

Using the same procedure as described above, except with N-bromoacetamide in place of N-bromosuccinimide, the same product is obtained.

Another variation of this process utilizes molecular bromine. Bromine gas is bubbled through the phenyl lithium/benzhydryl 7 - (2-thienylmethyleneiminomethylether) - 3 - carbamoyloxymethyldecephalosporanate solution at —78° C. The amount of bromine is regulated so that one equivalent is added. The procedure above is then followed until the product is isolated.

EXAMPLE 3

3-carbamoyloxymethyl-7-methoxy-7-(2-thienylacetamido)decephalosporanic acid

Benzhydryl 3 - carbamoyloxymethyl - 7-(2-thienylacetamido) decephalosporanate (300 mg.) in 0.5 ml. in anisole and 2.5 ml. of trifluoroacetic acid is reacted for 15 minutes at 10° C. The resulting mixture is evaporated at reduced pressure and flushed twice with anisole. The residue is dissolved in methylene chloride and extracted with 5% sodium bicarbonate solution. The aqueous solution is adjusted to pH 1.8 with 5% phosphoric acid and extracted with ethylacetate. The organic solution is dried and evaporated to yield the pure 3-carbamoyloxymethyl-7 - methoxy - 7 - (2-thienylacetamido)decephalosphoranic acid, M.P. 165–167° C. UV and NMR analysis provide data consistent with the assigned structure.

EXAMPLE 4

Sodium 3-carbamoyloxymethyl-7-methoxy-7-(2-thienylacetamido)decephalosporanate

The procedure as in Example 4 is followed except that the pH is adjusted to 8.0 with dilute sodium hydroxide and concentrated under vacuum to remove the solvents. The mono sodium salt of 3-carbamoyloxymethyl-7-methoxy - 7- (2 - thienylacetamido)decephalosphoranic acid is recovered.

What is claimed is:
1. The process of preparing the compound having the formula:

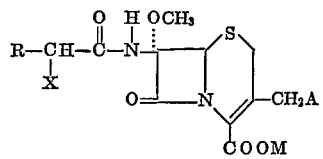

wherein X is hydrogen, amino, or carboxyl; R is phenyl, thienyl or furyl; A is hydrogen, loweralkanoyloxy, carbamoyloxy, thiocarbamoyloxy, N-loweralkylcarbamoyloxy, N - loweralkylthio, carbamoyloxy, N,N - diloweralkylcarbamoyloxy, N,N - diloweralkylthiocarbamoyloxy, pyridinium, or aminopyridinium; and M is sodium, potassium, benzhydryl, trimethylsilyl, trichloroethyl, methoxymethyl, hydrogen, benzoylmethyl, or methoxybenzyl, which comprises treating a compound of the formula:

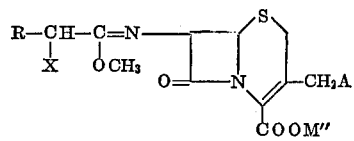

wherein R, X, and A are the same as above, and M' is benzhydryl, trimethylsilyl, trichloroethyl, methoxymethyl, benzoylmethyl, or methoxybenzyl, with about an equivalent amount of a strong inorganic base followed by
  (a) addition of about an equivalent amount of a methoxylating agent chosen from the group consisting of dimethylperoxide, methyl t-butylperoxide, methylphenyl sulfenate, O-methyldimethyl sulfoxonium methosulfate, and N-methoxypyridinium methosulfate; or
  (b) addition of about an equivalent amount of a brominating reagent selected from the group consisting of bromine, N-bromosuccinimide, N-bromoacetamide, t-butylhypobromite, or perhalomethyl hypobromite; followed by addition of about an equivalent of methanol in the presence of a catalytic amount of silver oxide; then acidifying the resultant reaction mixture; followed by deblocking when M is hydrogen, optionally followed by addition of sodium or potassium hydroxide when M is sodium or potassium.

2. The process of claim 1 in which the strong inorganic base is phenyl lithium, t-butyl lithium, or sodium hydride.

3. The process of claim 1 in which R is phenyl or thienyl, X is hydrogen or carboxyl, and A is carbamoyloxy, loweralkanoyloxy, or pyridinium.

4. The process of claim 3 in which R is thienyl, X is hydrogen, and A is carbamoyloxy.

5. The process of claim 3 in which R is thienyl, X is carboxyl, and A is carbamoyloxy.

6. The process of claim 3 in which R is phenyl, X is carboxyl, and A is acetoxy.

References Cited

Nagarajan et al.: J.A.C.S. vol. 93:9, pages 2308–2312, May 1971.

NICHOLAS S. RIZZO, Primary Examiner

U.S. Cl. X.R.

260—239.1; 424—246, 271

UNITED STATES PATENT OFFICE
CERTIFICATE OF CORRECTION

Patent No. 3,780,033　　　　　　　　Dated December 18, 1973

Inventor(s) George G. Hazen

It is certified that error appears in the above-identified patent and that said Letters Patent are hereby corrected as shown below:

In column 8, the second formula in Claim 1 should read:

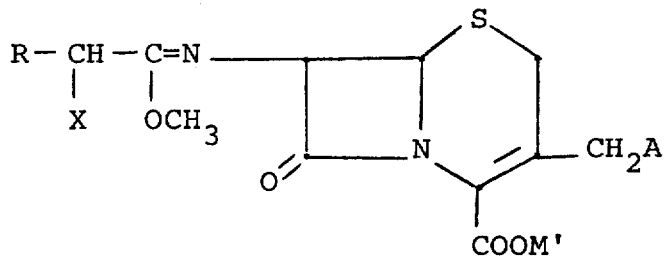

Signed and sealed this 9th day of April 1974.

(SEAL)
Attest:

EDWARD M. FLETCHER, JR.　　　　　　C. MARSHALL DANN
Attesting Officer　　　　　　　　　　Commissioner of Patents